(12) United States Patent
Yamanaka

(10) Patent No.: US 7,433,867 B2
(45) Date of Patent: *Oct. 7, 2008

(54) INFORMATION PROCESSING APPARATUS, INFORMATION DELIVERY SYSTEM, INFORMATION PROCESSING METHOD, AND RECORDING MEDIUM

(75) Inventor: Yasuhiro Yamanaka, Chiba (JP)

(73) Assignee: Sony Corporation, Tokyo (JP)

( * ) Notice: Subject to any disclaimer, the term of this patent is extended or adjusted under 35 U.S.C. 154(b) by 275 days.

This patent is subject to a terminal disclaimer.

(21) Appl. No.: 11/232,301

(22) Filed: Sep. 21, 2005

(65) Prior Publication Data

US 2006/0059203 A1   Mar. 16, 2006

Related U.S. Application Data

(63) Continuation of application No. 09/815,648, filed on Mar. 23, 2001, now Pat. No. 6,993,536.

(30) Foreign Application Priority Data

Mar. 24, 2000   (JP) .............................. 2000-088537

(51) Int. Cl.
G06F 17/30 (2006.01)
G06F 17/00 (2006.01)

(52) U.S. Cl. .................. 707/3; 707/4; 707/100; 707/101; 707/104.1; 709/236

(58) Field of Classification Search ............... 707/3–6, 707/10, 102, 104.1; 709/236
See application file for complete search history.

(56) References Cited

U.S. PATENT DOCUMENTS 5,542,023 A * 7/1996 Sakai et al. .......... 707/E17.009
6,088,337 A * 7/2000 Eastmond et al. ........... 370/280
6,496,520 B1 * 12/2002 Acosta ....................... 370/474
6,643,655 B2 * 11/2003 Oashi et al. ................... 707/10
6,654,389 B1 * 11/2003 Brunheroto et al. ......... 370/535

(Continued)

FOREIGN PATENT DOCUMENTS

JP   1990 046584   2/1990

(Continued)

OTHER PUBLICATIONS

"Information Technology—Generic Coding of Moving Pictures and Associated Adio: Systems Recommendation H.222.0"—ISO/IEC 13818-1 ISO/IEC JTC1/SC29/WG11N0801 Systems, Nov. 13, 1994 (pp. 22-44).*

(Continued)

Primary Examiner—Jean Bolte Fleurantin
Assistant Examiner—Anh Ly
(74) Attorney, Agent, or Firm—Finnegan, Henderson, Farabow, Garrett & Dunner, L.L.P.

(57) ABSTRACT

A multimedia file has a format in which actual data is embedded in a file structure. The multimedia information is assembled in blocks, each composed of a header area and a data area, and has a hierarchical structure in which a block is embedded in another block. Header area information may include a file name identification information (block name), a number of child blocks information and data length identification information. This arrangement facilitates the creation and editing of a multimedia file, permitting high-speed data searching.

6 Claims, 16 Drawing Sheets

U.S. PATENT DOCUMENTS 6,993,536 B2 * 1/2006 Yamanaka ............... 707/104.1

FOREIGN PATENT DOCUMENTS

| JP | 1993 128736 | 5/1993 |
| JP | 1998164142 | 6/1998 |
| JP | 1998 276407 | 10/1998 |
| JP | 1999 205358 | 7/1999 |
| JP | 1999 259525 | 9/1999 |
| JP | 1999 327802 | 11/1999 |
| JP | 2000 040300 | 2/2000 |

OTHER PUBLICATIONS

"Distance browsing in spatial databases"—Gisli R. Hjaltason and Hanan Samet—ACM Transactions on Database Systems (TODS). vol. 24, Issue Jun. 2, 1999, ACM-1999 (pp. 265-318).*

"An area efficient video/audio codec for portable multimedia application"—Part et al.—May 26-31, 2000. IEEE, circuits and systems, 2000. (pp. 595-598 vol. 1).*

"Multimedia presentation development using the audio visual connection"—D.J. Moore—IBM Systems Journal, vol. 29, No. 4, 1990—9pps: 494-508).*

ISO/IEC "Information Technology—Generic Coding of Moving Pictures and Associated Audio: Systems Recommendation H.220.0" 1994, Revision E pp. 22-44, Nov. 13, 1994.

Japanese Office Action issued on Apr. 22, 2008 in counterpart Japanese Application No. 2000-088537.

* cited by examiner

FIG. 6A

| CLUSTER | SECTOR | SOUND GROUP |
|---|---|---|
| 0032h | 00h | 0h |
| 0 0 0 0 0 0 0 0 0 0 1 1 0 0 1 0 | 0 0 0 0 0 0 0 0 | 0 0 0 0 |

| SHORT | 0 0 0 0 0 0 0 0 1 1 0 0 1 0 | 0 0 0 0 0 0 | 0 0 0 0 |
|---|---|---|---|
| | 00h | C8h | 00h |

FIG. 6B

| CLUSTER | SECTOR | SOUND GROUP |
|---|---|---|
| 0032h | 04h | 0h |
| 0 0 0 0 0 0 0 0 0 0 1 1 0 0 1 0 | 0 0 0 0 0 1 0 0 | 0 0 0 0 |

| SHORT | 0 0 0 0 0 0 0 0 1 1 0 0 1 0 | 0 0 0 1 0 0 | 0 0 0 0 |
|---|---|---|---|
| | 00h | C8h | 40h |
| OFFSET | 0 0 0 0 0 0 0 0 0 0 0 0 0 0 | 0 0 0 1 0 0 | 0 0 0 0 |
| | 00h | 00h | 40h |

FIG. 6C

| CLUSTER | SECTOR | SOUND GROUP |
|---|---|---|
| 0032h | 13h | 9h |
| 0 0 0 0 0 0 0 0 0 0 1 1 0 0 1 0 | 0 0 0 1 0 0 1 1 | 1 0 0 1 |

| SHORT | 0 0 0 0 0 0 0 0 1 1 0 0 1 0 | 0 1 0 0 1 1 | 1 0 0 1 |
|---|---|---|---|
| | 00h | C9h | 39h |
| OFFSET | 0 0 0 0 0 0 0 0 0 0 0 0 0 0 | 0 1 0 0 1 1 | 1 0 0 1 |
| | 00h | 01h | 39h |

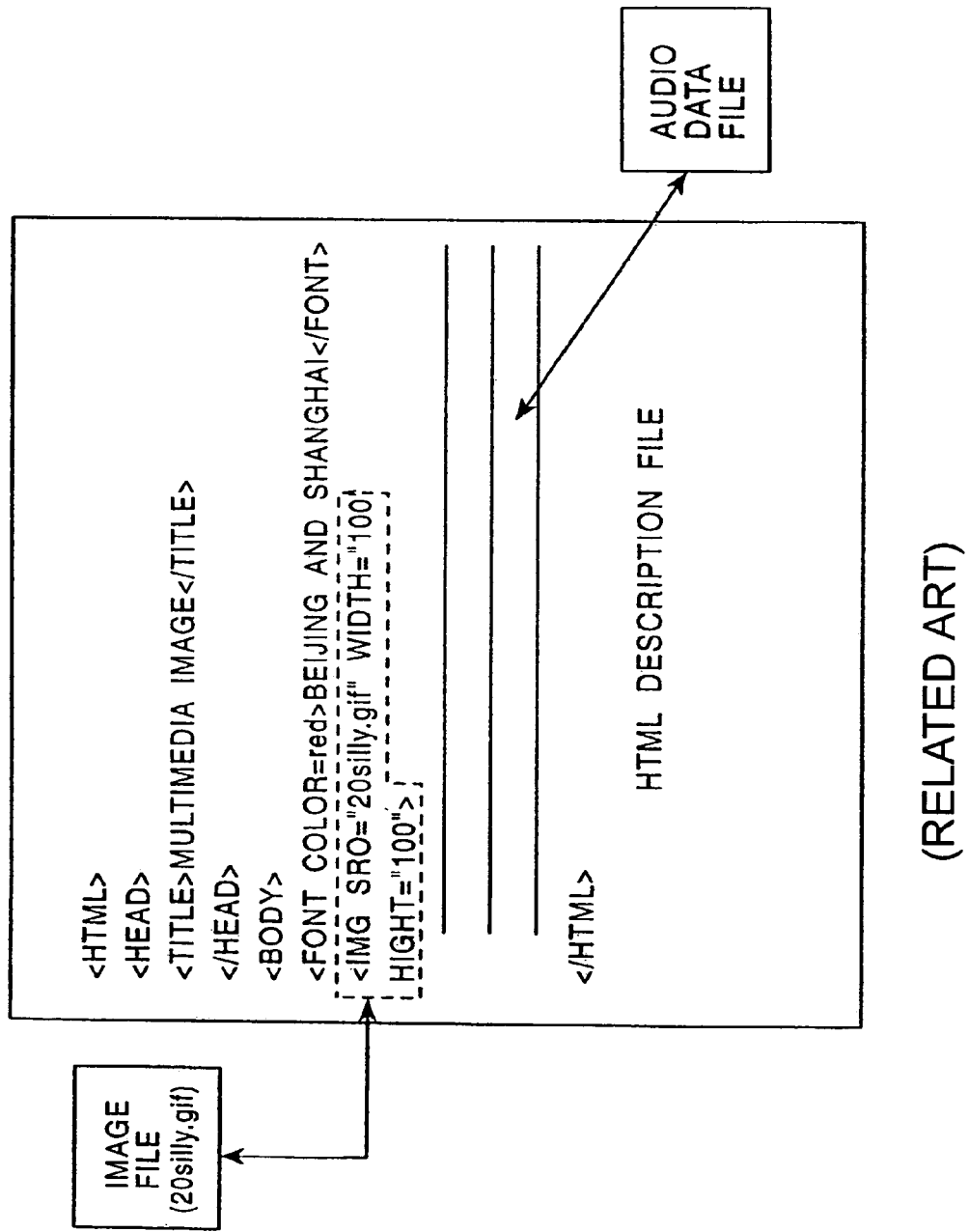

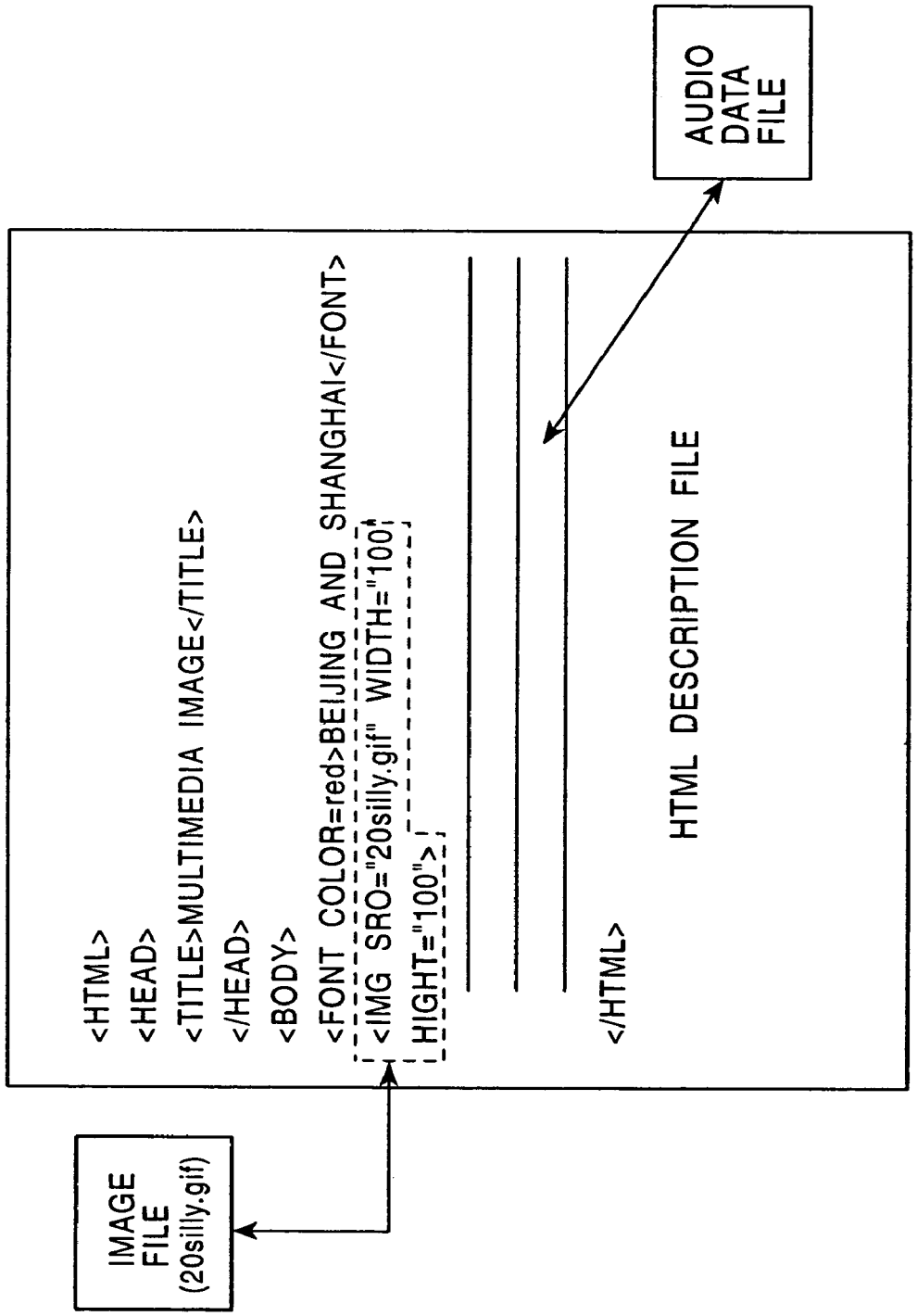

INFORMATION PROCESSING APPARATUS, INFORMATION DELIVERY SYSTEM, INFORMATION PROCESSING METHOD, AND RECORDING MEDIUM

This is a Continuation of U.S. application Ser. No. 09/815,648, filed Mar. 23, 2001 now U.S. Pat. No. 6,993,536, which is hereby incorporated by reference in its entirety herein.

BACKGROUND OF THE INVENTION

1. Field of the Invention

The present invention relates to an information delivery system for delivering the content of multimedia information, an information processing apparatus for use in the information delivery system, an information processing method, and a recording medium recording the multimedia information.

2. Description of the Related Art

In one of known systems, a server transmits audio data as a musical composition to a user, delivering the musical composition to a recording medium of the user or an audio player having a recording medium therewithin. Such a system is a music delivery system.

Besides the audio data as the musical composition, information transmitted and received in the music delivery system can include image data such as of a jacket of the music record or other media, and text data such as lyrics. Types of data to be transmitted and received are not only audio data but also a content including the image data and the text data.

To create these pieces of multimedia information, a description language called HTML (Hyper Text Markup Language) is widely used.

In the HTML, information is presented in a file which created using an identifier called a tag delimited by symbols <, > as shown in FIG. 15. The content and meaning of the tag is fixed in the HTML. Referring to FIG. 15, for example, a link is made to an image data file having a file name 20silly.gif as an external reference file to present the image data in a desired location by describing a tag <IMG SRC="20 silly.gif" width=100 HEIGHT"=100>.

An audio (voice) data file, although not shown in FIG. 15, is prepared as an external reference file, and a predetermined tag is used in the description. A link is made to the audio data file to reproduce it.

A music delivery system using the multimedia information is now considered.

The top priority is to transmit the audio data as musical composition data as fast and precise as possible. The music delivery system works even if other types of information in association with the audio data are transmitted later.

When the HTML is employed for a multimedia information file for music delivery, an HTML description file and musical composition data as an external reference file of the HTML description file are transmitted. The music delivery is thus based on the assumption that not only the musical composition data but also the HTML description file is transmitted.

When a single multimedia information file of the HTML format linked to a plurality of pieces of musical composition data is transmitted, each of these pieces of musical composition data needs to be individually linked to the HTML description file.

The music delivery service in practice requires that a number of pieces of musical composition data be transmitted in association with a single multimedia information file. The number of pieces of musical composition data linked to a single HTML description file becomes quite large.

On the delivery side of the musical composition data, the creation of multimedia information becomes difficult and troublesome accordingly. The possibility of the generation of software bugs increases, thereby lowering work efficiency on the delivery side.

The receiver side of the musical composition data is required to read the HTML description file from the header thereof and successively interpret the tags to search for a target musical composition data. Such a process is time-consuming and burdensome on the receiver side. Besides the HTML, XML (Extensible Markup Language) is known as a description language, which is used in cooperation with the HTML as a Web page. The same is true of the XML.

It is not practically appropriate that a service for delivering a large amount data such as many pieces of musical composition data is carried out using the multimedia information file composed of the description file and the external reference file.

SUMMARY OF THE INVENTION

Accordingly, it is an object of the present invention to improve the performance of data delivery service so that the burden on a data delivery side and a data receiver side involved in the processing of multimedia information is lightened in the data delivery service.

The present invention in one aspect relates to an apparatus for processing information, and includes an information acquisition unit for acquiring multimedia information having a structure of block data including a header area and a data area holding data, a data extractor for extracting desired data from the multimedia information acquired by the information acquisition means, through searching, based on the content described in the header area of the multimedia information, and a reproducing unit for reproducing the data extracted by the data extractor.

The present invention in another aspect relates to a system for delivering information, and includes a delivery apparatus and an information receiver apparatus. The information delivery apparatus includes a storage unit for storing at least one piece of multimedia information having a structure of block data including a header area and a data area holding data, and a transmitter for transmitting multimedia information selected from at least one piece of multimedia information stored in the storage means. The information receiver apparatus includes a receiver for receiving the multimedia information transmitted by the information delivery apparatus, a data extractor for extracting, through searching, desired data from the multimedia information received by the receiver means, based on the content described in the header area of the multimedia information, and a reproducing means for reproducing the data extracted by the data extractor.

The present invention in yet another aspect relates to a method for processing multimedia information, and includes the steps of acquiring, from outside, multimedia information having a structure of block data including a header area and a data area holding data, extracting, through searching, desired data from the multimedia information acquired through the acquiring step, based on the content described in the header area of the multimedia information, and reproducing the data extracted by the data extracting step.

The present invention in still another aspect relates to a recording medium and records multimedia information, having a structure of block data, including a header area and a data area holding data.

In the above arrangement, the multimedia information handled by the present invention includes data associated with a header. A file itself includes data therewithin. In other words, the arrangement of the present invention is different from a structure which includes a description file of a text and an external reference file. In accordance with the present invention, target data is searched for in the multimedia information, based on the content of header information of the multimedia information, and the target information is then reproduced. The process of the multimedia information for data reproduction is more efficient and lighter in duty than searching for linked data referencing the description file.

BRIEF DESCRIPTION OF THE DRAWINGS

FIGS. 6A, 6B, and 6C show an address example of the disk of the embodiment of the present invention;

FIG. 11 shows a dump image of a multimedia file;

FIG. 14 is a conceptual view showing the structure of an HTML file.

DESCRIPTION OF THE PREFERRED EMBODIMENTS

The embodiments of the present invention are now discussed.

1 Information Delivery System 1.1 General Construction

The information delivery system of one embodiment of the present invention is a system for delivering audio data as a musical composition.

Figure 1:
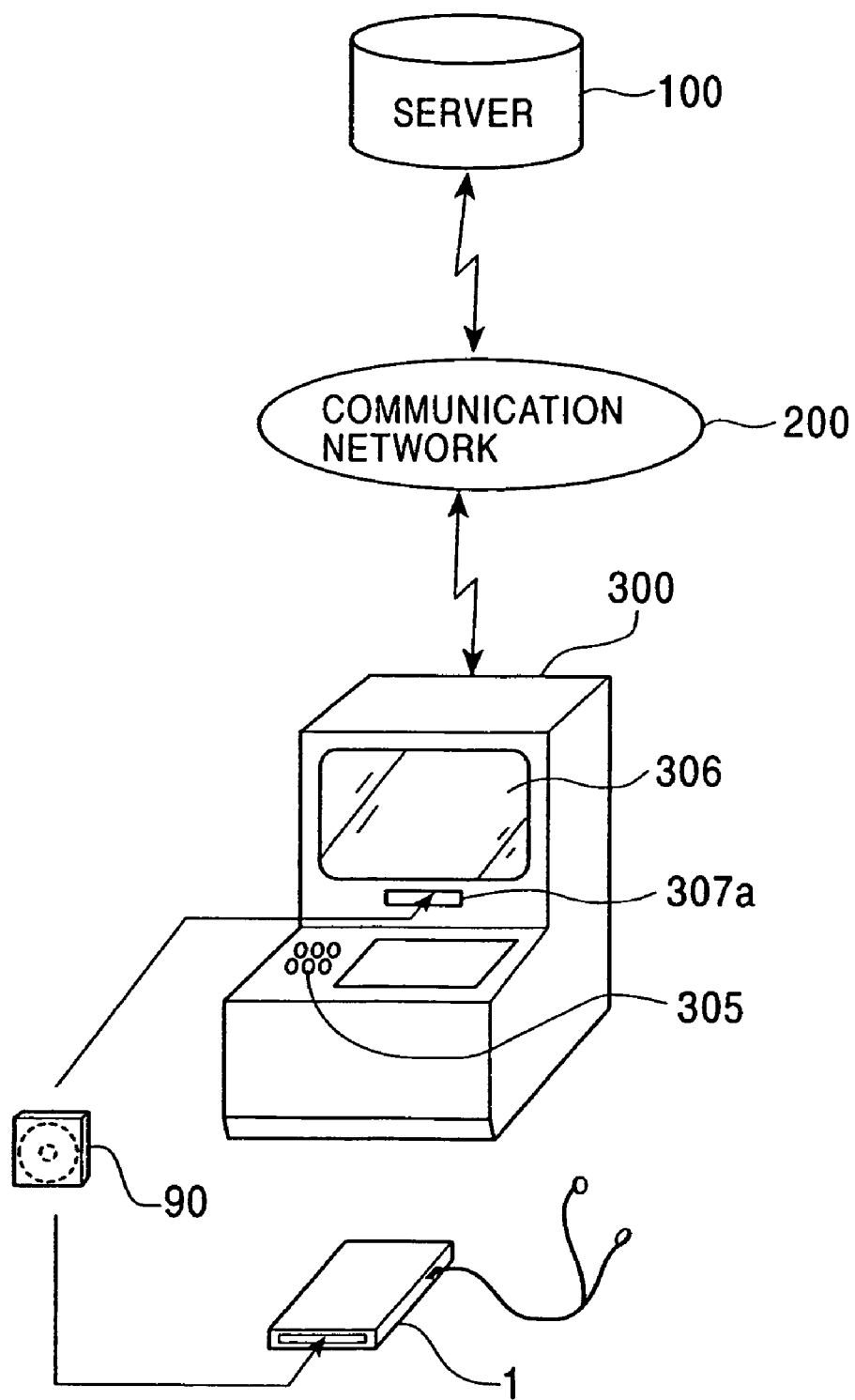
FIG. 1 is a block diagram showing the construction of a delivery system of one embodiment of the present invention.

FIG. 1 generally shows the information delivery system of this embodiment.

As shown, a server 100 stores a number of multimedia files as data to be delivered. As will be discussed in detail later, the multimedia file holds audio data (musical composition data) of at least one musical composition, image data such as of a jacket of a medium of music data, and text data such as lyrics. Such a multimedia file may be supplied by a record company.

The server 100 is connected to numerous receiver terminals 300 through a communication network 200. The server 100 transmits the multimedia file through the communication network 200.

The receiver terminals 300 may be installed at station stalls, convenience stores, public telephone booths, homes, etc. The receiver terminal 300 receives the multimedia file transmitted from the server 100, and stores a relative large number of multimedia files.

A predetermined recording medium is loaded into a medium port 307a of the body of the receiver terminal 300. The media port 307a receives an MD (Mini Disk), which records and plays back compressed audio data in a predetermined scheme. The receiver terminal 300 includes an operation panel 305 having a variety of controls for downloading the musical composition data, and a display 306 which presents various displays concerning the downloading.

The user of the recording and reproducing device 1 loads a disk 90, which may be the user's own MD, into the media port 307a, designates desired musical composition data to be downloaded, by operating the operation panel 305, and then, for example, signs a contract for buying the musical composition data.

The receiver terminal 300 searches for and extracts the designated musical composition data from among a plurality of multimedia files stored therewithin, and writes the extracted musical composition data onto the disk 90 loaded in the media port 307a. In this way, the musical composition data bought by the user is downloaded into the disk 90 owned by the user.

The recording and reproducing device 1, shown in FIG. 1 is owned by the user, and records and reproduces the audio data on the MD. For example, the user loads the disk 90 having the downloaded musical composition data recorded thereon into the recording and reproducing device 1, and reproduces a track as the musical composition data, thereby hearing the bought music.

Some proposed MD formats allow not only the audio data but also AUX data, such as still picture data and text data, attached to the audio data to be recorded and reproduced. In this embodiment of the present invention, as well, the multimedia file also holds the AUX data, and the receiver terminal 300 records the AUX data together with the audio data on the loaded disk 90.

A device, owned by the user and working with the MD, may be a reproducing only device.

As long as the receiver terminal 300 has a two-way communication capability with the server 100 via the communication network 200, the receiver terminal 300 can request the server 100 to send a desired multimedia file thereto.

In the information delivery system of this embodiment, the receiver terminal 300 stores information sent from the server 100, and copies information, from among several pieces of information stored therewithin, requested by the user onto a recording medium with which the recording and reproducing device 1 is compatible.

The communication network 200 includes, but is not limited to, communications satellites, an ISDN (Integrated Services Digital Network), a CATV (Cable Television or Community Antenna Television), an analog telephone line, and a variety of wireless communications.

1.2 Construction of the Server and Receiver Terminal

Figure 2:
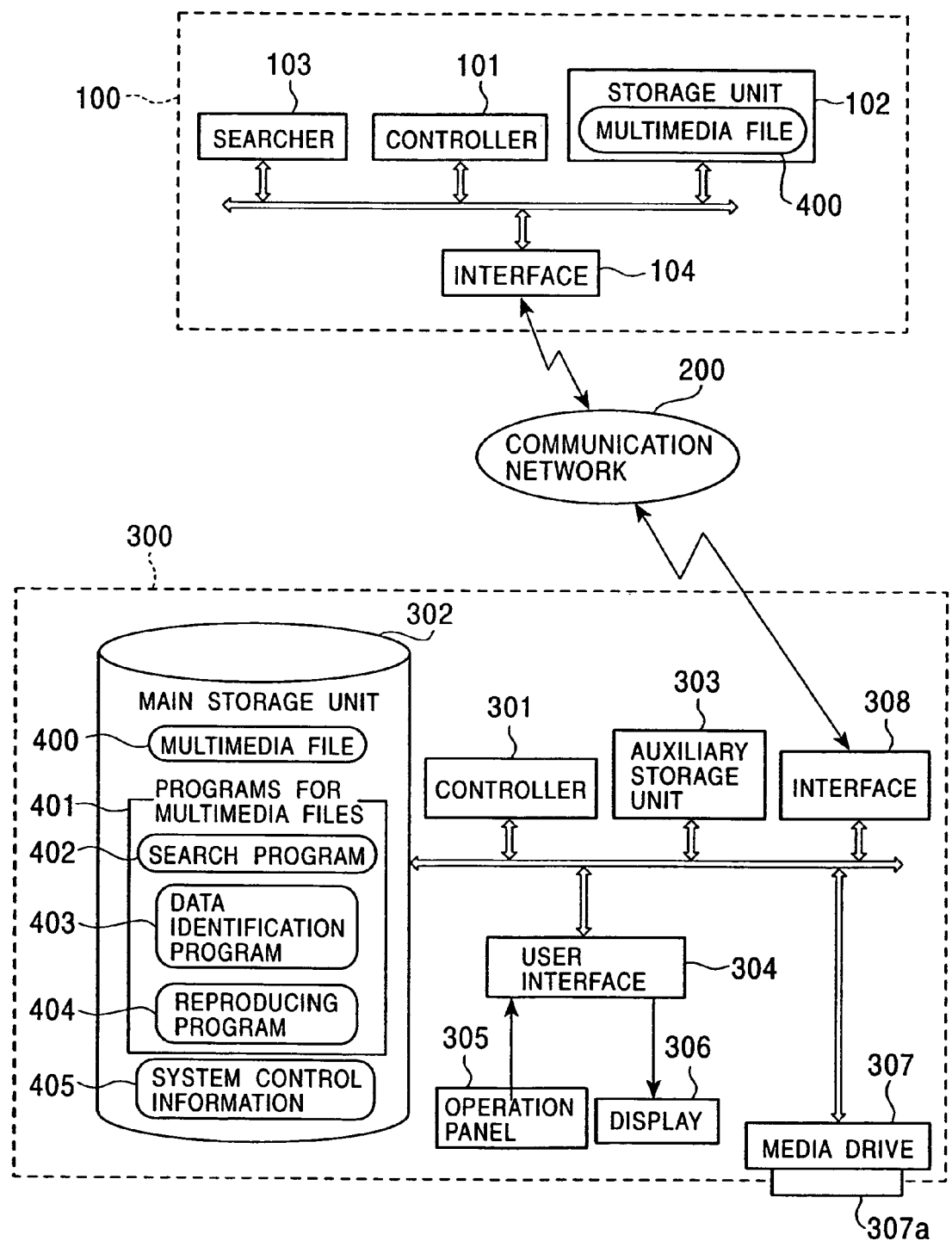
FIG. 2 is a block diagram showing the construction of a server and a terminal constituting the delivery system.

FIG. 2 shows the construction of the server 100 and the receiver terminal 300.

The server 100 shown here includes a controller 101, a storage unit 102, a searcher 103, and a interface 104, and the circuits of these units exchange information via a bus line.

As shown, the controller 101 is formed of a computer, and performs control and a variety of processes on the components in the server 100.

The interface 104 performs communication with the receiver terminal 300 via the communication network 200. The transmission protocol during transmission may be a unique one or the TCP/IP (Transmission Control Protocol/Internet Protocol) widely used in the Internet. Data may be packetized through one of these transmission protocol.

The searcher 103 under the control of the controller 101 searches for desired data in data stored in the storage unit 102. When the server 100 needs to send a designated multimedia file to the receiver terminal 300, the searcher 103 searches for the multimedia file to be transmitted, from among the data stored in the storage unit 102.

The storage unit 102 is a large capacity recording medium, and a driver for driving the recording medium. A number of multimedia files 401 as data to be delivered is stored in the storage unit 102. It is also contemplated that desired information relating to the information delivery service such as user related data including billing information is stored in the storage unit 102.

The use of a magnetic tape used in current broadcasting apparatuses is contemplated as the storage unit 102. If a hard disk, an IC memory, an optical disk, or a magnetooptical disk is used for the storage unit 102, a random access is allowed, thereby enhancing the efficiency in the storage and retrieval of data.

The receiver terminal 300 includes a controller 301, a main storage unit 302, an auxiliary storage unit 303, a user interface 304, an operation panel 305, a display 306, an interface 308, and a media drive 307. All of the circuits of these units are interconnected to each other via a data bus.

When power is on in this system, basic input/output startup information stored in a ROM as the auxiliary storage unit 303 allows the circuits of these units to operate. Reading system control information 405 stored in the main storage unit 302, the controller 301 executes a process, thereby enabling the receiver terminal 300 to perform a basic system operation.

The main storage unit 302, which is a relatively large capacity device such as a hard disk, stores numerous multimedia files 400 transmitted from the server 100.

A program for multimedia file 401, which is an application program for performing a process for a multimedia file, is also stored. The controller 301 reads and starts the multimedia file program 401, thereby executing a download operation for downloading data onto the MD in response to the operation by the user.

The system control information 405 is also stored in the main storage unit 302.

As shown, the programs for multimedia file 401 include a search program 402, a data identification program 403, and a reproduction program 404.

These programs are now briefly discussed. The search program 402 searches and identifies a designated multimedia file, from among multimedia files stored in the main storage unit 302. The data identification program 403 searches and identifies a block (data) stored in a structure to be discussed later, from the searched multimedia file. The reproduction program 404 performs a reproduction process on the data in the block searched by the data identification program 403.

The meaning of the "reproduction process" is not limited to a process of merely reproducing and outputting the audio data in the form of an audio signal when the audio data is input. In this embodiment, for example, a transfer process for writing the data onto the medium, including extracting data from the multimedia file and performing some process on the extracted data, is also included in the "reproduction process."

The auxiliary storage unit 303 includes a memory such as a ROM and a RAM. For example, the ROM stores the above-mentioned basic input/output startup information. The RAM stores data generated when the controller 301 performs the processes and process data resulting from the execution of the function of the circuit of each unit.

The user interface 304 interfaces with the operation panel 305 and the display 306. For example, the user interface 304 transfers, to the controller 301, operation information which is generated in response to the operation of the operation panel 305 by the user, and transfers, to the display 306, display data input under the control of the controller 301. The display 306 thus presents a desired display.

The interface 308 interfaces with the server 100 via the communication network 200.

The media drive 307 records and reproduces the data onto the media loaded into the media port 307a as already discussed. In this embodiment, the medium is an MD. The media drive 307 is thus constructed to be compatible with the MD in the recording and reproduction operations. In this embodiment, among a plurality of pieces of data held in the multimedia file, the media drive 307 records, on the MD, data of a format recordable on the MD.

1.3 Recording and Reproducing Device

Figure 3:
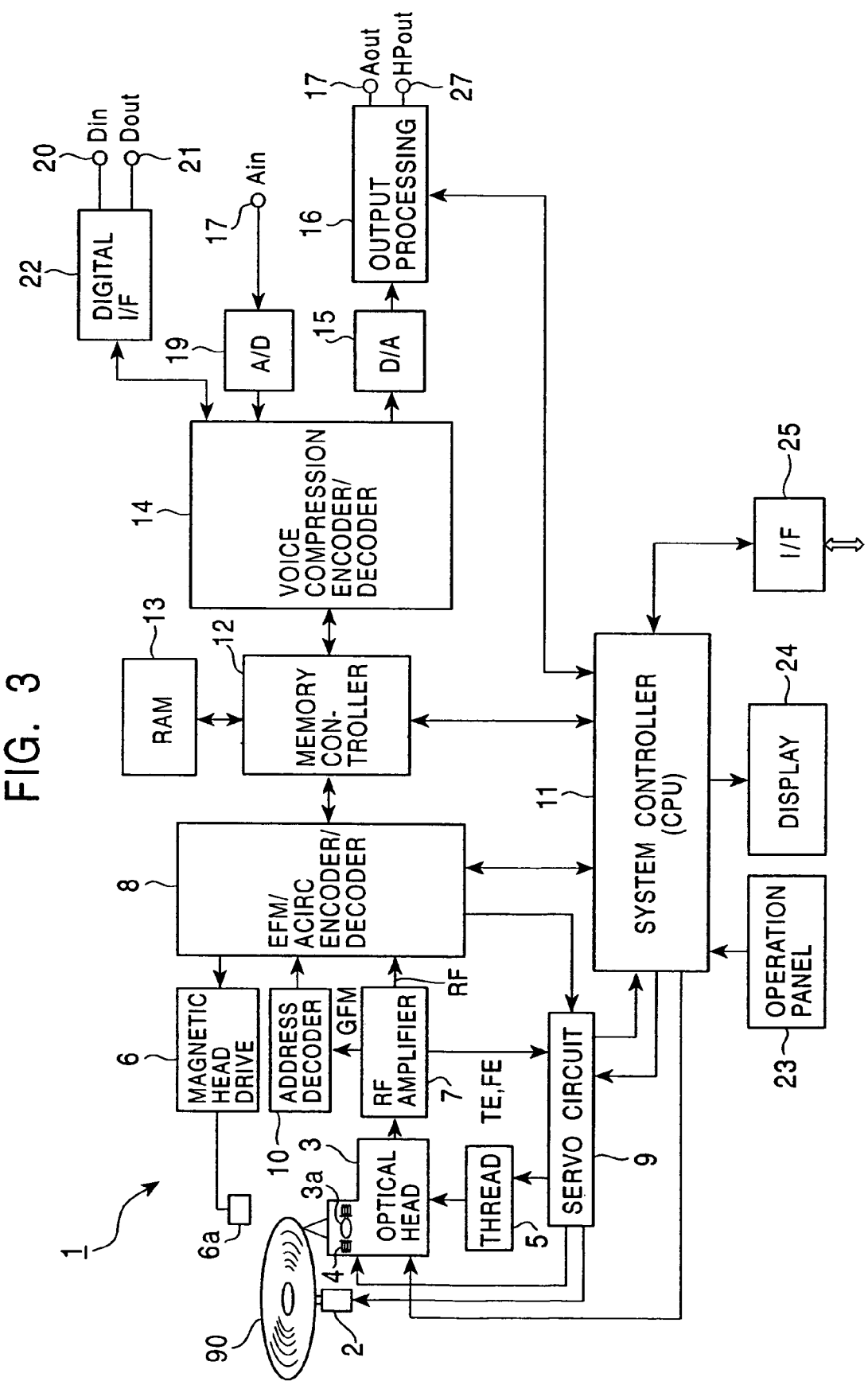
FIG. 3 is a block diagram showing the construction of a recording and reproducing apparatus for reproducing musical composition data downloaded through the delivery system.

FIG. 3 shows the recording and reproducing device 1 of the Mini Disk of the embodiment of the present invention.

The mangetooptical disk (Mini Disk) 90 storing voice data is rotated by a spindle motor 2. An optical head 3 directs a laser beam to the magnetooptical disk 90 during recording and reproduction.

The optical head 3 outputs a laser high in level enough to heat a recording track to the Curie temperature during the recording, and outputs a relatively low-level laser to detect data from a reflected light beam through the Kerr effect during the reproduction.

The optical head 3 includes a laser diode as a laser output means, an optical system including a polarizing beam splitter and an objective lens 3a, and a detector for detecting a reflected light beam. The objective lens 3a is supported by a two-axis mechanism 4 in such a manner that allows the objective lens 3a to move in a radial direction of the disk and in a direction in which the objective lens 3a approaches or gets away from the disk.

A magnetic head 6a is arranged diametrically opposite to the optical head 3 across the disk 90. The magnetic head 6a applies, on the magnetooptical disk 90, a magnetic field that is modulated with supplied data.

The entire optical head 3 and the magnetic head 6a are movably supported by a threading mechanism 5 in the radial direction of the disk 90.

The information, which is detected from the disk 90 by the optical head 3 during the reproduction operation, is fed to an RF amplifier 7. The RF amplifier 7 extracts the reproduced RF signal, a tracking error signal TE, a focus error signal FE, group information (absolute positional information recorded as a pre-group (wobbling group) in the magnetooptical disk 90) GFM, and so on from the supplied information through arithmetic operations.

The extracted RF signal is supplied to an encoder/decoder 8. The tracking error signal TE and the focus error signal FE are supplied to a servo circuit 9, and the group information GFM is supplied to an address decoder 10.

The servo circuit 9 generates various servo driving signals according to the tracking error signal TE and the focus error signal FE supplied, as well as according to a track jump command and an access command from a system controller 11 including a computer, and the information of a detected rotation speed of the spindle motor 2 to control the two-axis mechanism 4 and the threading mechanism 5 to control both focusing and tracking, as well as to control the spindle motor 2 at a fixed linear velocity (CLV: Control Linear Velocity).

The address decoder 10 extracts address information by decoding supplied group information GFM. The address information is supplied to the system controller 11 and used to control various parameters.

The reproduced RF signal is decoded with a processing such as EFM (Eight-Fourteen Demodulation Coding) demodulation or CIRC (Cross Interleave Reed Solomon Coding) decoding in the encoder/decoder 8. At this time, address and subcode data are also extracted and supplied to the system controller 11.

Voice data (sector data) decoded with the processing such as EFM demodulation and the CIRC in the encoder/decoder 8 is written in a buffer memory 13 by a memory controller 12. The speed of the optical head 3 to read data from the disk 90 and transfer the reproduced data to the buffer memory 13 is 1.41 Mbit/s. Typically, the read and transfer operation are performed intermittently.

The data written on the buffer memory 13 is read at a timing so that the reproduced data is transferred at 0.3 Mbit/s and supplied to an encoder/decoder 14. The data is subjected to the signal processing such as a decoding processing for the compressed audio data, becoming 44.1 kHz sampling and 16-bit quantized digital audio signals.

The digital audio signal is converted into an analog signal through a digital-to-analog converter 15, and is then subjected to a level adjustment and an impedance adjustment in an output processor 16, and is output to an external apparatus as an analog audio output Aout from a line output terminal 17. The audio signal is output as a headphone output HPout at a headphone output terminal 27 to be fed to a headphone connected thereto.

The digital audio signal decoded in the encoder/decoder 14 is fed to a digital interface 22 so that a digital audio signal Dout is output at a digital output terminal 21 to be fed to an external apparatus. For example, the digital audio signal Dout is transmitted to the external apparatus through a optical-fiber cable.

When a recording operation is performed on the magnetooptical disk 90, a recording signal supplied through a line input terminal 18 (an analog audio signal Ain) is converted into digital data through an analog-to-digital converter 19, and is thereafter fed to the encoder/decoder 14. The digital recording signal is subjected to a voice compression and encoding process.

When an external apparatus feeds a digital audio signal Din to a digital audio terminal 20, the digital interface 22 extracts a control code, etc., while the audio data thereof is fed to the encoder/decoder 14 to be subjected to the audio compression and encoding process.

A microphone input terminal, although not shown, is arranged to use a microphone input as a recording signal.

The recording data compressed by the encoder/decoder 14 is then written and stored onto the buffer memory 13 by the encoder/decoder 14. The recording data is then read every predetermined data unit and is sent to the encoder/decoder 8. The recording data is encoded through the CIRC encoding and the EFM modulation by the encoder/decoder 8, and is then fed to a magnetic head drive circuit 6.

The magnetic head drive circuit 6 supplies a magnetic head drive signal to the magnetic head 6a in response to the encoded recording data. Specifically, the magnetic head 6a applies a magnetic field of N or S to the magnetooptical disk 90. The system controller 11 then feeds a control signal to output a laser beam at a recording level to the optical head 3.

An operation panel 23, used by the user for operation, is provided with a diversity of operation keys and dials as controls. The controls include those relating to recording and reproduction operations, such as reproduction, recording, pause, stop, FF (fast forward), REW (rewinding), and AMS (automatic music sensing), those relating to a play mode, such as normal reproduction, program reproduction, and shuffle reproduction, those relating to a display mode operation for switching a display state on a display 24, those relating to a program editing operation, such as a track (program) splitting, a track linking, a track erasing, a track name inputting, and a disk name inputting, those relating operations such as the recording, and reproduction of the AUX data, and the operation mode as will be discussed later.

The operation information in response to the operation of the keys and dial is fed to the system controller 11, and the system controller 11 performs control in accordance with the operation information.

The display operation of the display 24 is controlled by the system controller 11.

To cause the display 24 to execute the display operation, the system controller 11 transmits data to be displayed to a display driver within the display 24. In response to the supplied data, the display driver drives the display such as a liquid-crystal panel, thereby presenting desired numerals, characters and symbols.

The display 24 presents the operational status of the disk now recording or replaying, a track number, a recording time/reproduction time, and an editing status on the screen thereof.

The disk 90 stores text information (such as a track name) managed in association with programs as the main data thereof. The display 24 displays characters when the text information is input or the text information is read from the disk 90.

The disk 90 also stores the auxiliary data (the AUX data) which is a data file separate from the data such as the musical composition as a program. The data file as the AUX data is a text and a still picture. The text and the still picture may also be presented on the display 24.

Presenting the text information and the still picture information as the AUX data requires a relatively large screen, and a full-dot display or a CRT (Cathode-Ray Tube) display is appropriate. For this reason, the AUX data may be output to an external monitor through an interface 25.

Although the user can record the AUX data file onto the disk 90, an image scanner, a personal computer or a keyboard may be used as an input device. The AUX data file from such an input device may be input through the interface 25.

The system controller 11 is a microcomputer composed of a CPU (Central Processor Unit), a program ROM, a working RAM, and interfaces, and controls the above-referenced various control.

To record and replay the data on the disk 90, management information recorded in the disk 90, i.e., P-TOC (Premastered TOC), U-TOC (user TOC) must be read. In response to the management information, the system controller 11 determines the address of an area on which a recording is performed, and the address of an area from which a reproduction is performed.

The management information is held in the buffer memory 13.

The system controller 11 reads the management information by performing the reproduction operation along the innermost circle of the disk on which the management information is recorded, when the disk 90 is loaded. The system controller 11 stores the management information in the buffer memory 13 so that the management information is referenced when the recording, reproduction and editing operations are performed on the disk 90.

The U-TOC is re-written in accordance with the recording of and a variety of process on the program data. At each of the recording and editing operations, the system controller 11 updates the U-TOC information stored in the buffer memory 13, and rewrites the U-TOC area of the disk 90 at a predetermined timing in response to the updating.

The disk 90 stores the AUX data file separate from the programs. The disk 90 has AUX-TOC formed for the management of the AUX data file.

When reading the U-TOC, the system controller 11 also reads the AUX-TOC, stores the AUX-TOC onto the buffer memory 13 so that the AUX data management state is referenced, as necessary.

The system controller 11 reads, as necessary, the AUX data file at a predetermined timing (or at the time of reading the AUX-TOC), and stores the AUX data file onto the buffer memory 13. The system controller 11 causes the display 24 or the external apparatus via the interface 25 to present the text or the image on screen at the output timing managed by the AUX-TOC.

Figure 4A:
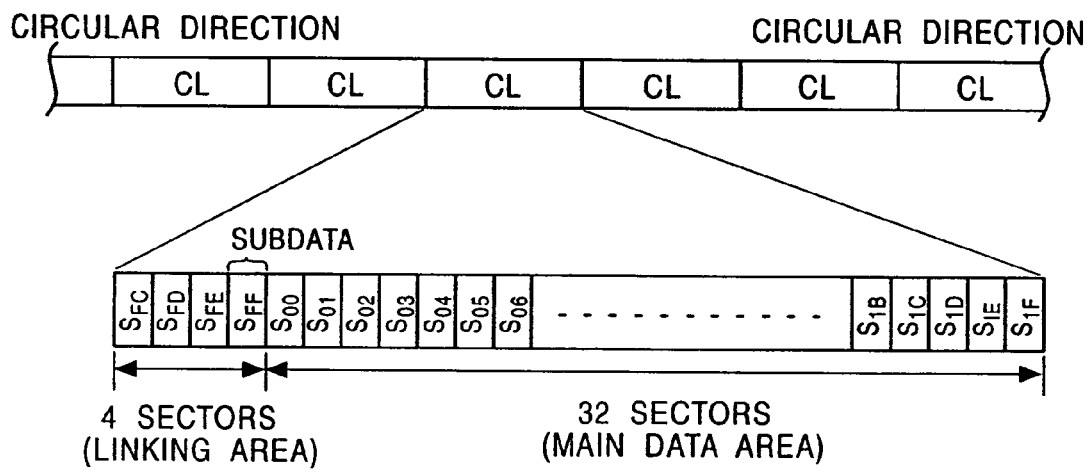
FIGS. 4A and 4B show a sector format of a disk of the embodiment of the present invention.
Figure 4B:
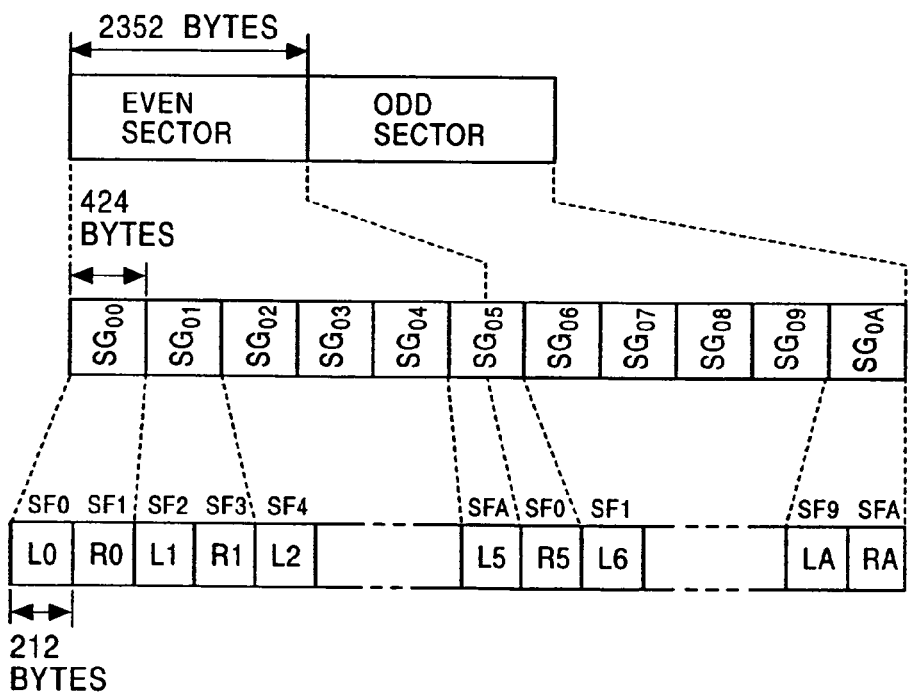

Referring to FIGS. 4A and 4B, a sector and a cluster, which are data units defined in the MD format, are discussed.

As shown in FIGS. 4A and 4B, clusters CL are consecutively arranged as a recording track in the Mini Disk system. One cluster is a minimum unit during the recording. One cluster corresponds to two to three circular tracks.

One cluster CL includes a linking area of four sectors of SFC-SFF, and a main data area including 32 sectors of S00-S1F.

One sector is a data unit composed of 2352 bytes.

Out of subdata areas of the four sectors, the sector SFF is referred to as a subdata sector, and is used to record information as subdata. The three sectors SFC-SFE are not used to record data.

The TOC data, the audio data, the AUX data, etc. are recorded in the main data area.

The address is recorded every sector.

The sector is further divided into smaller units called sound groups. Two sectors are divided into 11 sound groups.

As shown, the two consecutive sectors of an even sector such as S00 and an odd sector such as S01 include sound groups SG00-SG0A. One sound group is composed of 424 bytes, and corresponds to the amount of sound data as long as 11.61 ms.

Data, divided between an L channel and an R channel, is recorded in a single sound group SG. For example, the sound group SG00 is composed of L-channel data L0 and R-channel data R0, and the sound group SG01 is composed of L-channel data L1 and R-channel data R1.

212 bytes as a data area for the L channel or the R channel are referred to as a sound frame.

Figure 5:
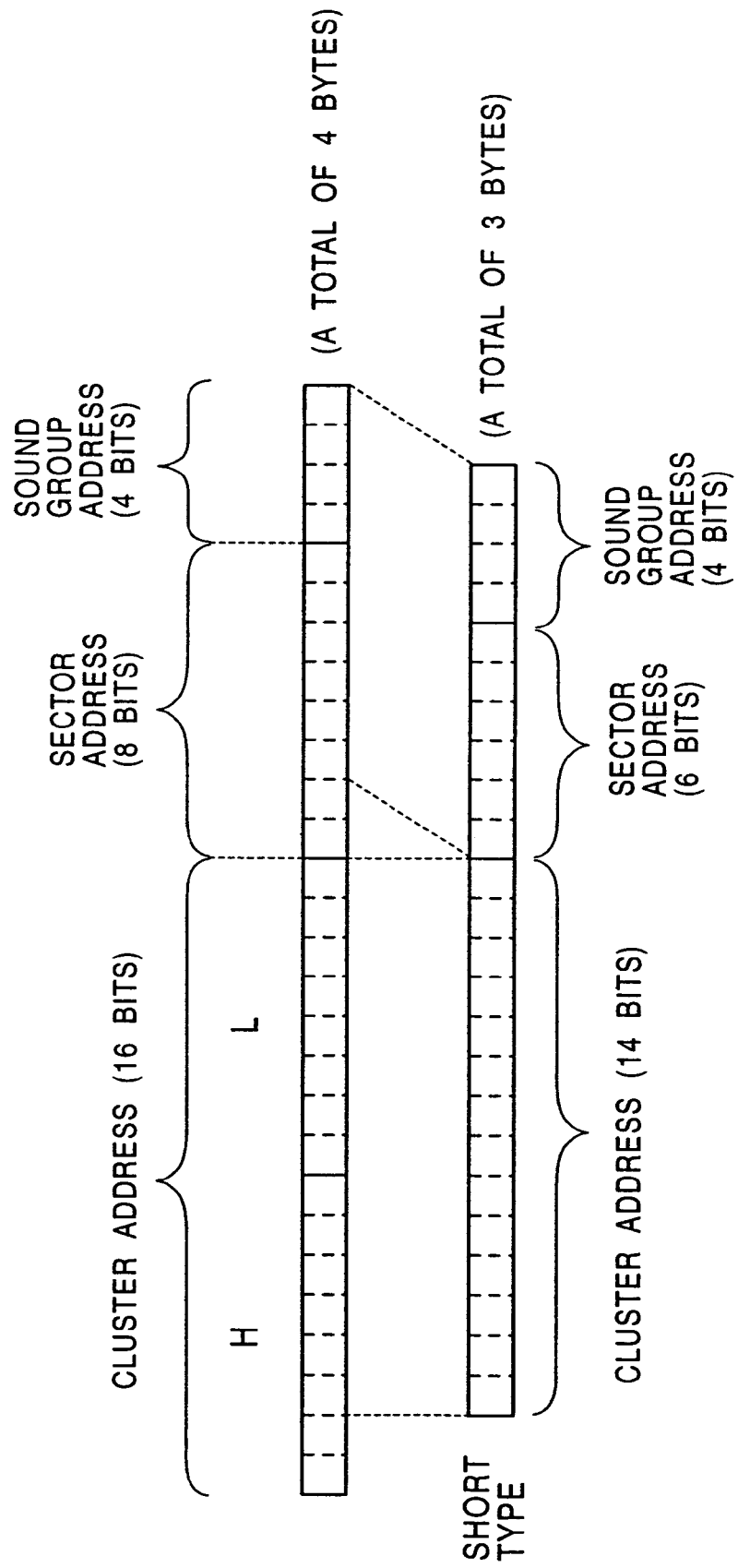
FIG. 5 shows an address format of the disk of the embodiment of the present invention.

Referring to FIG. 5, the address form in the Mini Disk format is now discussed.

The address of each sector is expressed by a cluster address and a sector address. As shown in the upper portion of FIG. 5, the cluster address is 16 bit number (=2 bytes), and the sector address is an 8 bit number (=1 byte).

The addresses of these three bytes are recorded at the head of each sector.

The address of the sound group in the sector is expressed by adding a 4 bit sound group address in succession to the sector address. In the management of the U-TOC, the addition of the sound group address allows a reproduction position to be set according to the unit of sound group.

In the U-TOC and the AUX-TOC, short-form addresses are used to express the cluster address, the sector address, and the sound group address in three bytes as shown in the lower portion of FIG. 5.

One cluster includes 36 sectors, and the sector address is expressed in six bits. The upper two bits of the sector address can thus be omitted. Since the cluster is expressed in 14 bits to the outermost circle of the disk, the upper two bits of the cluster address can be omitted.

The addresses designating the sound group are thus expressed in the three bytes by omitting the upper two bits of each of the sector address and the cluster address.

In the U-TOC and the AUX-TOC, the address managing a reproduction position and a reproduction timing is expressed in a short form. The address is an absolute address. Alternatively, the use of an offset address is contemplated. The offset address is a relative address indicating a position within a program such as a musical composition with an address zero position set to be at the start position of the program. Referring to FIGS. 6A, 6B, and 6C, the offset address is discussed.

Figure 7:
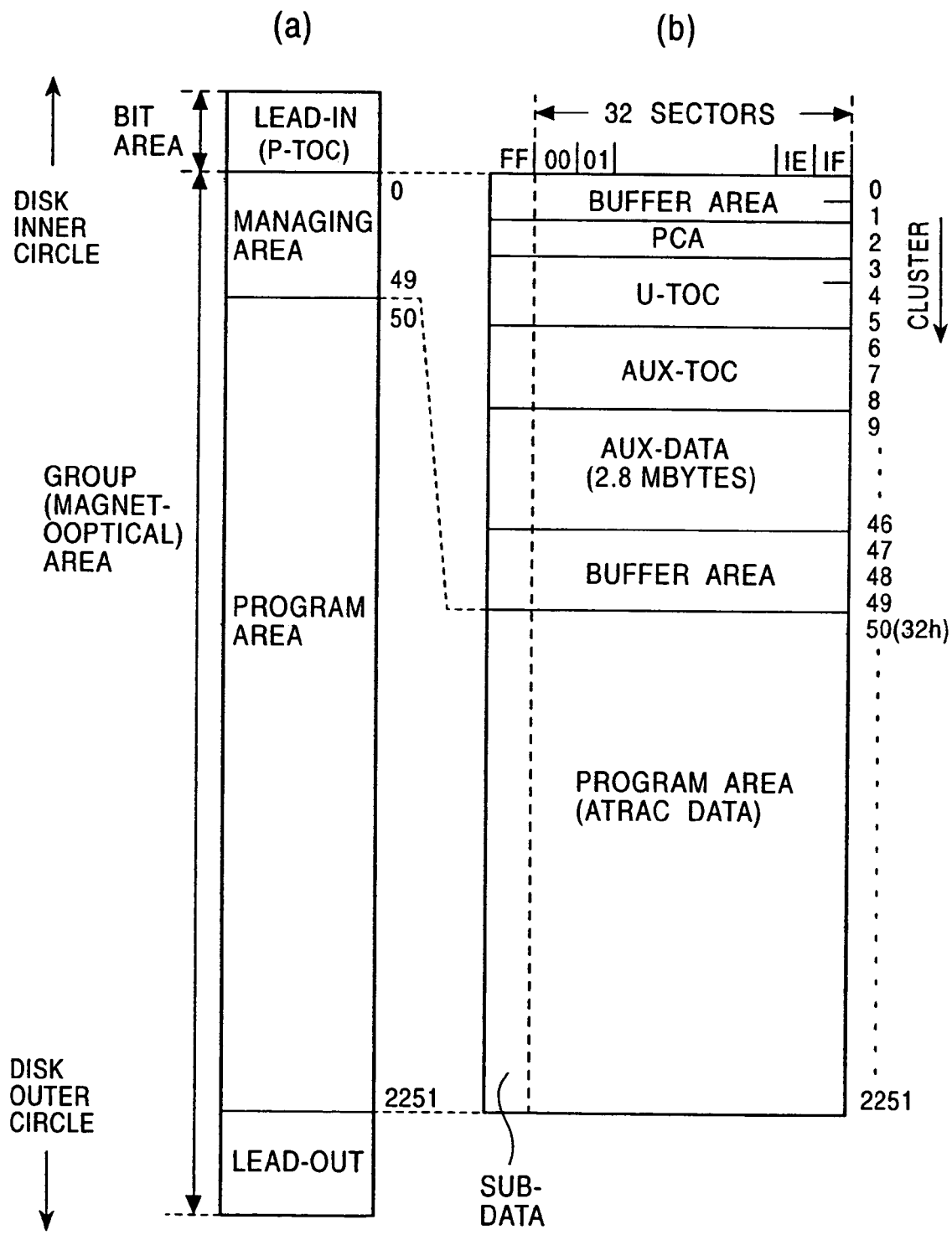
FIG. 7 shows an area structure of the disk of the embodiment of the present invention.

Referring to FIG. 7, the recording of a program such as a musical composition starts at the 50th cluster on the disk (cluster 32h in hexadecimal expression; any number ending with h is a hexadecimal number throughout this specification)

For example, the addresses at the head of a first program (cluster 32h, sector 00h, and sound group 0h) are "00000000001100100000000000000", i.e., (0032h, 00h, 0h) as shown in the upper portion of FIG. 6A. In a short form thereof, the addresses are "00000000110010000000000" (i.e., 00h, C8h, 00h) as shown in the lower portion of FIG. 6A.

With a starting point set at this start address, the address of the cluster 0032h, the sector 04h, and the sound group 0h as one location within the position of the first program is expressed in "00h, Ch8, 40h" in a short-form absolute address as shown in FIG. 6B. On the other hand, in the offset address, the cluster 0000h, the sector 04h, and the sound group 0h are expressed using a difference to the start address as a starting point. The offset address is thus expressed in "00h, 00h, 40h."

With a starting point set at the start address in FIG. 6A, the address of the cluster 0032h, the sector 13h, and the sound group 9h as one location within the position of the first program is expressed in "00h, Ch9, 39h" in a short-form absolute address as shown in FIG. 6C. On the other hand, the offset address is thus expressed in "00h, 01h, 39h."

In this way, a location within the program is designated by one of the absolute address and the offset address.

The area structure of the disk 90 (MD) of this embodiment is discussed, referring to FIG. 7.

FIG. 7(a) shows areas from the innermost circle to the outermost circle in the disk 90.

The disk 90 as an magnetooptical disk includes a pit area where reproduction only data is formed on the innermost ring side of the disk through an emboss pit method. The P-TOC is recorded there.

A magnetooptical area, arranged outside the pit area, includes grooves serving as a guide groove for a recording track and enables recording and reproduction.

Cluster 0 through cluster 49 on the inner most ring of the magnetooptical area serve as a management area. The program area in the magnetooptical area actually recording programs such as actual musical compositions ranges from cluster 50 to cluster 2251. A ring surrounding the program area is a lead-out area.

FIG. 7(b) shows the management area in detail. FIG. 7(b) shows the sectors in a horizontal direction and the clusters in a vertical direction.

Clusters 0 and 1 in the management area serve as a buffer area to the pit area. A cluster 2 is a power calibration area PCA, and is used to adjust the output power of a laser light beam.

Clusters 3, 4, and 5 record the U-TOC. The content of the U-TOC will be discussed later. Each sector in one cluster defines a data format and records predetermined management information. The cluster having such a sector becoming the U-TOC data is repeatedly stored three times, i.e., on the clusters 3, 4, and 5.

Clusters 6, 7, and 8 record the AUX-TOC. The content of the AUX-TOC will be discussed later. Each sector in one cluster defines a data format and records predetermined management information. The cluster having such a sector becoming the AUX-TOC data is repeatedly stored three times, i.e., on the clusters 6, 7, and 8.

The area ranging from the cluster 9 to the cluster 46 record the AUX data. The data file as the AUX data is organized according the sector unit. Organized here may be a picture file sector as a still picture file to be discussed later, a text file sector as a text information file, a karaoke text file sector as a text information file synchronized with the program.

The area recording the data file as the AUX data and the AUX data file within the AUX data area is managed by the AUX-TOC.

The recording capacity for the data file in the AUX data area is 2.8 Mbytes when the error correction mode 2 is employed.

For example, a second AUX data area may be created in a latter half of a program area or an area external to the outermost ring of the program area (for example, in the lead-out area) to increase the recording capacity for the data file.

Clusters 47, 48, and 49 serve as buffer areas to the program area.

The program area on the 50th cluster (=32h) and succeeding clusters records voice data of at least one musical composition in a compression method called ATRAC (Adaptive Transform Acoustic Coding).

The area recording the program is managed by the U-TOC.

In each cluster in the program area, a sector FFh may be used for subdata for recording information of any type.

The Mini Disk system finds applications in a reproduction only disk in which a program as data for reproduction only is recorded in a pit method. The entire reproduction only disk serves as a pit area. The recorded programs are managed by the P-TOC in almost the same way as by the U-TOC to be discussed later, and no U-TOC is formed.

When the reproduction only data file is recorded as the AUX data, the AUX-TOC for managing it is also recorded.

2 Multimedia File
2.1 Basic Construction

The data structure of the multimedia file exchanged between the server 100 and the receiver terminal 300 in the delivery system is now discussed.

The multimedia file in this embodiment is formed according to the unit of block holding data. One block has a structure in which a plurality of blocks is stored in a hierarchical manner.

Figure 8:
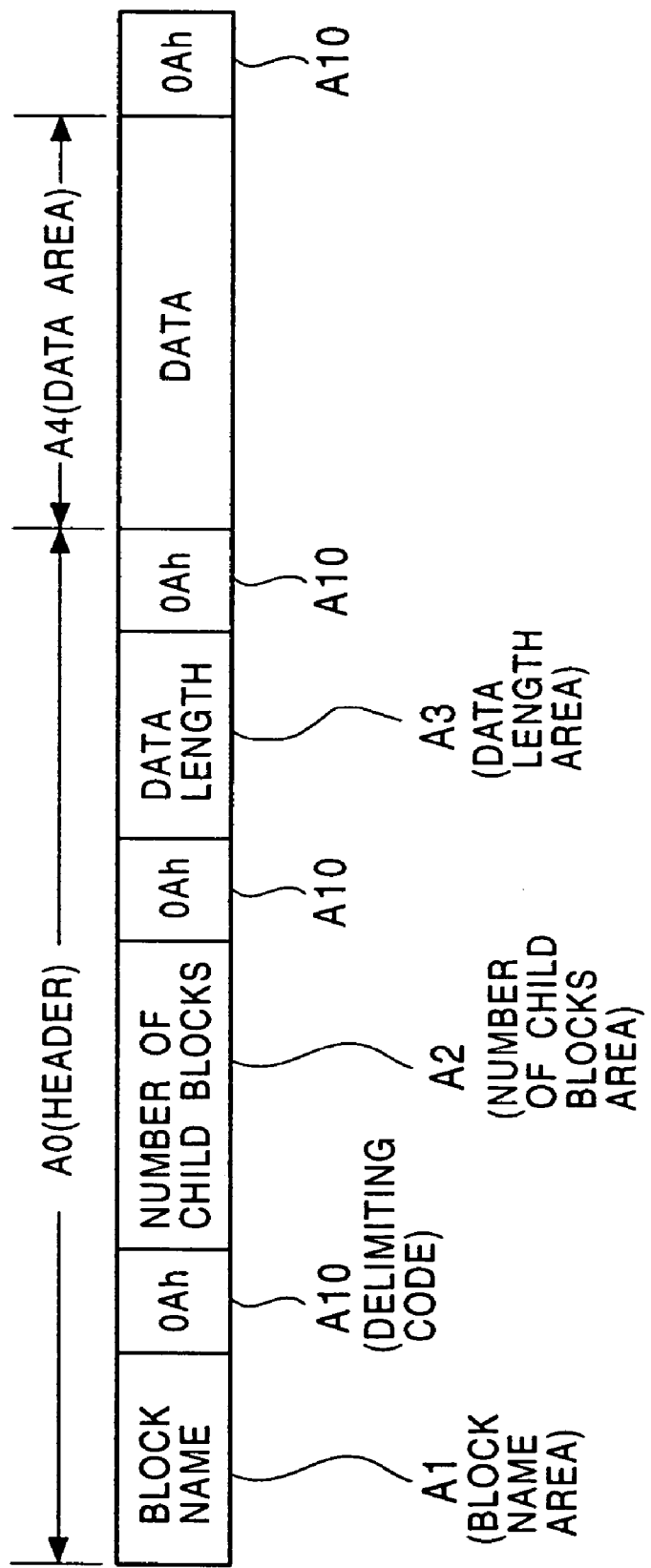
FIG. 8 shows the construction of block data.

The structure of one block is discussed referring to FIG. 8.

As shown, one block includes first a header area A0, followed by a data area A4.

The header area A0 includes, from the head thereof, a block name area A1, a number of child blocks area A2, and a data length area A3 in that order. Within the one block, each delimiting code A10 having a predetermined length (two bytes, for example), is inserted at a break point between the areas. As shown, the data area A4 ends with the delimiting code 10.

The block name area A1 stores a block name identifying the content of the data stored in the current block. The block name is expressed using ASCII codes of 20h to 7Eh (a number ending with h is a hexadecimal number).

The number of child blocks area A2 stores a number indicating the number of child blocks stored in the data area A4 of the current block under a hierarchical structure, using decimal ASCII strings (30h-39h).

The structure of the multimedia file of this embodiment allows a grandchild block to be stored in a child block. The number of child blocks merely indicates the count of child blocks. For example, when no child blocks are present with data held in the current block data area, the number of child blocks is zero. If the number of child blocks is ten, ten child blocks are stored therewithin.

The data length area A3 indicates the data size of the data area A4 of the current block. The byte number of the data area A4 is indicated by a decimal ASCII code string (30h-39h). The data size indicated here excludes the size of the delimiting code A10 that attaches to the end of the data area A4.

The data is contained in the data area A4. The block unit itself is stored in a hierarchical structure.

The data stored in the data area A4 is any byte strings having the byte number designated by the data length. Binary data can thus be stored. An application software is free to set what type of format is used for the data stored. The multimedia file of this embodiment allows binary data to be directly embedded into the file description structure. For example, unlike the HTML and XML, the binary data is not handled as the external reference file of a description file. In accordance with this embodiment, the data area A4 thus holds the compressed audio data compatible with the MD format as discussed with reference to FIG. 3 through FIG. 7, the image file as the AUX data, and the text data.

As for the multimedia file in the embodiment, a child block may be stored in one parent block in the above-referenced block structure, as will be discussed next.

Figure 9:
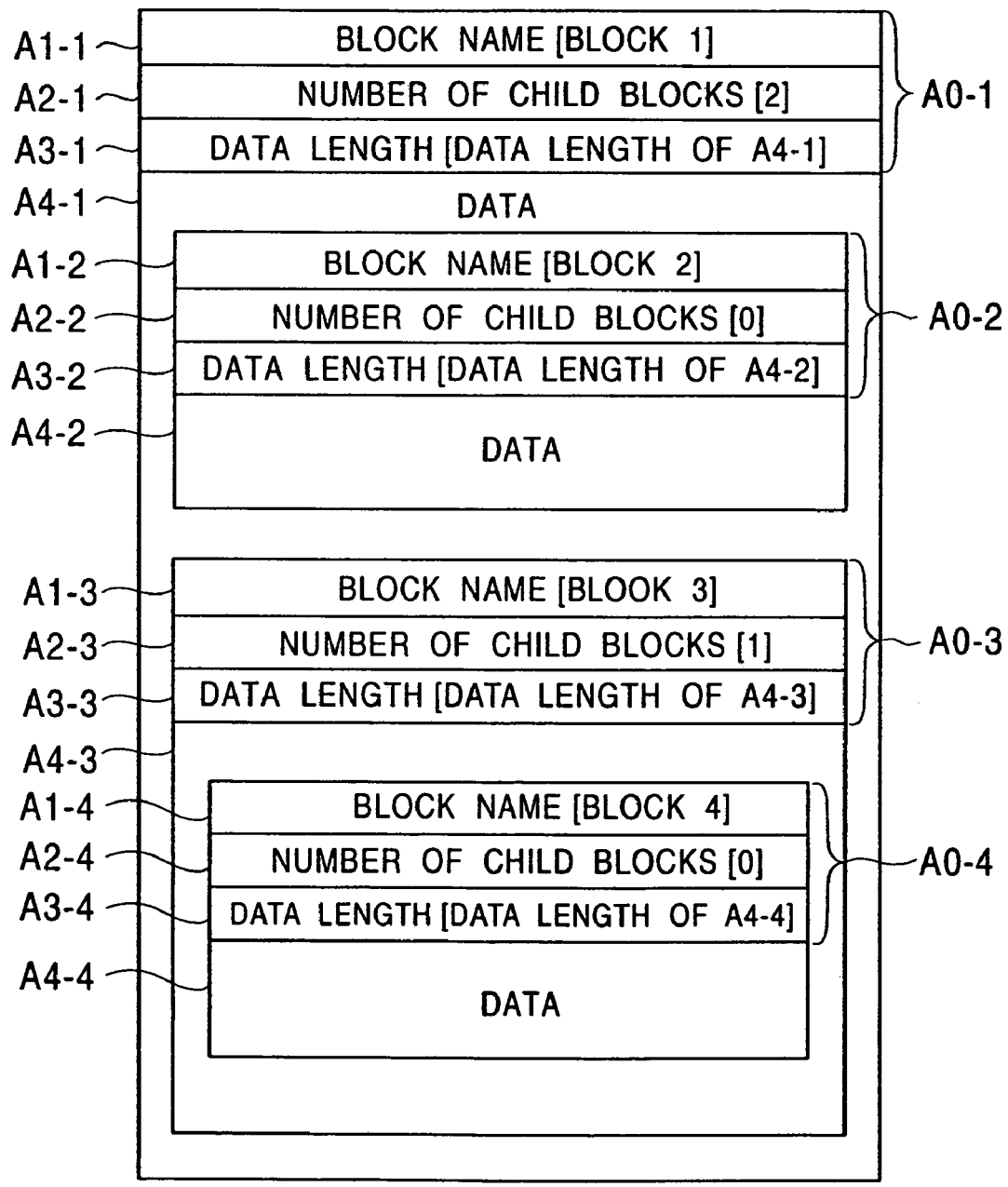
FIG. 9 shows the hierarchical structure of the block data.

FIG. 9 shows one example of the multimedia file. As shown, the delimiting code A10 is not shown for simplicity of explanation.

The multimedia file is generally composed of a block 1. The block 1 includes a header area A0-1, and a data area A4-1. The block name area A1-1 of the header area A0-1 stores "block 1" as the block name thereof. The number of child blocks area A2-1 stores "2" as the number of child blocks stored in the data area A4-1 as will be discussed later. The data length area A3-1 indicates the actual data size of the data area A4-1.

In this case, as shown, the data area A4-1 of the block 1 holds two child blocks, namely, block 2 and block 3.

In this embodiment, the data area A4 of one block can contain at least one child block. As a rule, the block having a child block in the data area A4 thereof is prohibited from directly describing data for itself in the data area A4. In other words, the data area A4 having the child block is composed of the child block only.

Here, of the child blocks 2 and 3 stored in the data area A4-1 of the block 1, the block 2 is first described. The block 3 is then described. Specifically, the data sequence within the data area A4-1 is the block 2 to the block 3.

The block 2 is composed of a header area A0-2 and a data area A4-2 in succession thereto. The block name area A1 of the header area A0-2 stores "block 2" as the block name thereof. The data area A4-2 of the block 2 holds the data of the block 2 itself rather than storing a child block. The number of child blocks area A2-2 thus holds "0", indicating that no child block is held. The data length area A3-2 indicates the actual data size of the data area A4-2. As already discussed, the data area A4-2 stores the data of the block 2 itself.

The block 3 includes a header area A0-3 and a data area A4-3. The block name area A1-3 of the header area A0-3 holds "block 3" as the block name thereof. Since the data area A4-3 of the block 3 holds a single child block, the number of child blocks area A2-3 states "1". The data length area A3-3 indicates the actual size of the data area A4-3. The data area A4-3 holds a block 4 as the data of block unit.

The block 4 is composed of a header area A4-0 and a data area A4-4. The block name area A1-4 of the header area A0-4 holds "block 4" as the block name thereof. Since the data area A4-4 of the block 4 stores the data of its own rather than a child block, the number of child blocks area A2-4 holds "0". A data length area A3-4 indicates the actual size of the data area A4-4. The data area A4-4 stores the data of the block 4 itself.

Figure 10:
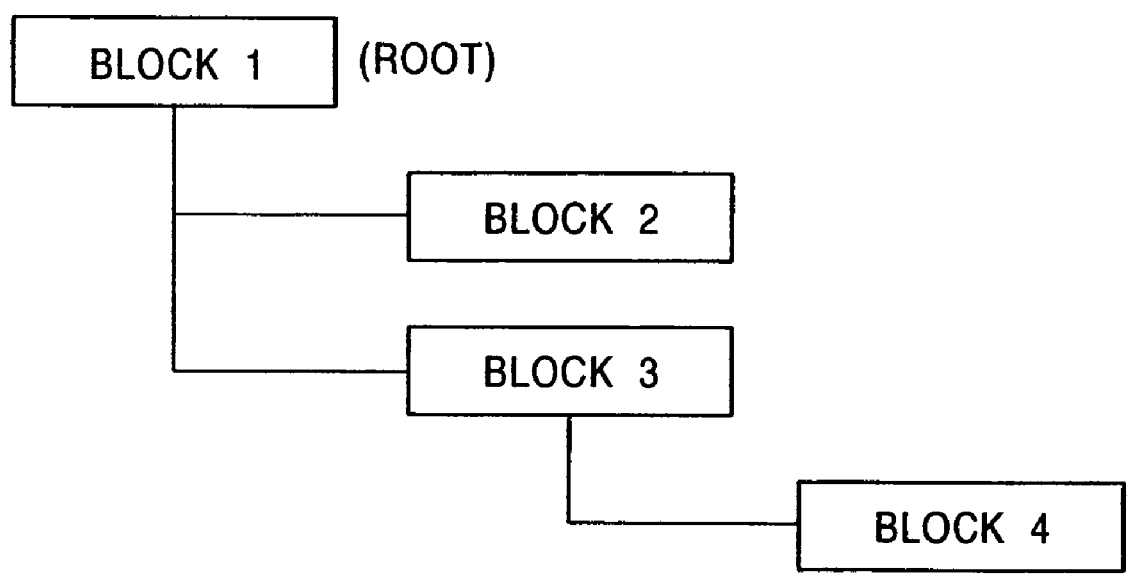
FIG. 10 shows the hierarchy of the blocks shown in FIG. 9.

The multimedia file in FIG. 9, if viewed in terms of blocks, is shown in FIG. 10.

Specifically, the block 1 is a root block. The block 2 and the block 3 are placed under the block 1 in the hierarchy. The block 4 is placed under the block 3 in the hierarchy.

If the block 4 is viewed from the block 1, the block 4 is a grandchild block. In the format of the multimedia file of this embodiment, the blocks are further hierarchically arranged below grandchildren. Any block forming the multimedia file can have child blocks thereunder. As a rule, only one root block is permitted in the hierarchy.

As another example, the following multimedia file is now considered.

<parent>
<child 1>abc</child 1>
<child 2>def</child 2>
</parent>

The dump image of the multimedia file is shown in FIG. 11. When the data to be stored in the data area is a text in the multimedia file of this embodiment, all data is expressed in text data.

The structure of such a multimedia file has the following advantages.

First, in accordance with the present invention, the body of the data, even if it is binary, is embedded in the multimedia file. Unlike the HTML and XML, the body of the data is not handled as an external reference file. The server, which delivers a number of pieces of audio data in a single multimedia file, can easily create and edit the multimedia file, and manage the created file. The work efficiency on the server is thus increased.

The processing side, which processes the uploaded multimedia file, references the block name, the number of child blocks, the data length to search for desired data. If the data length is referenced after knowing the block name and the number of child blocks, the searching is made jumping the data sequence according to the described data length.

To search for data in the HTML and XML, the tags written in a description file need to read from the first of the file. It takes time to obtain search results. In contrast, this embodiment permits search results to be quickly obtained.

2.2 Specific Structure of the Multimedia File

The multimedia file of this embodiment has the structure as described. The specific structure of the multimedia file transmitted and received in the delivery system shown in FIG. 1 is discussed, referring to FIG. 12 and FIG. 13.

Figure 12A:
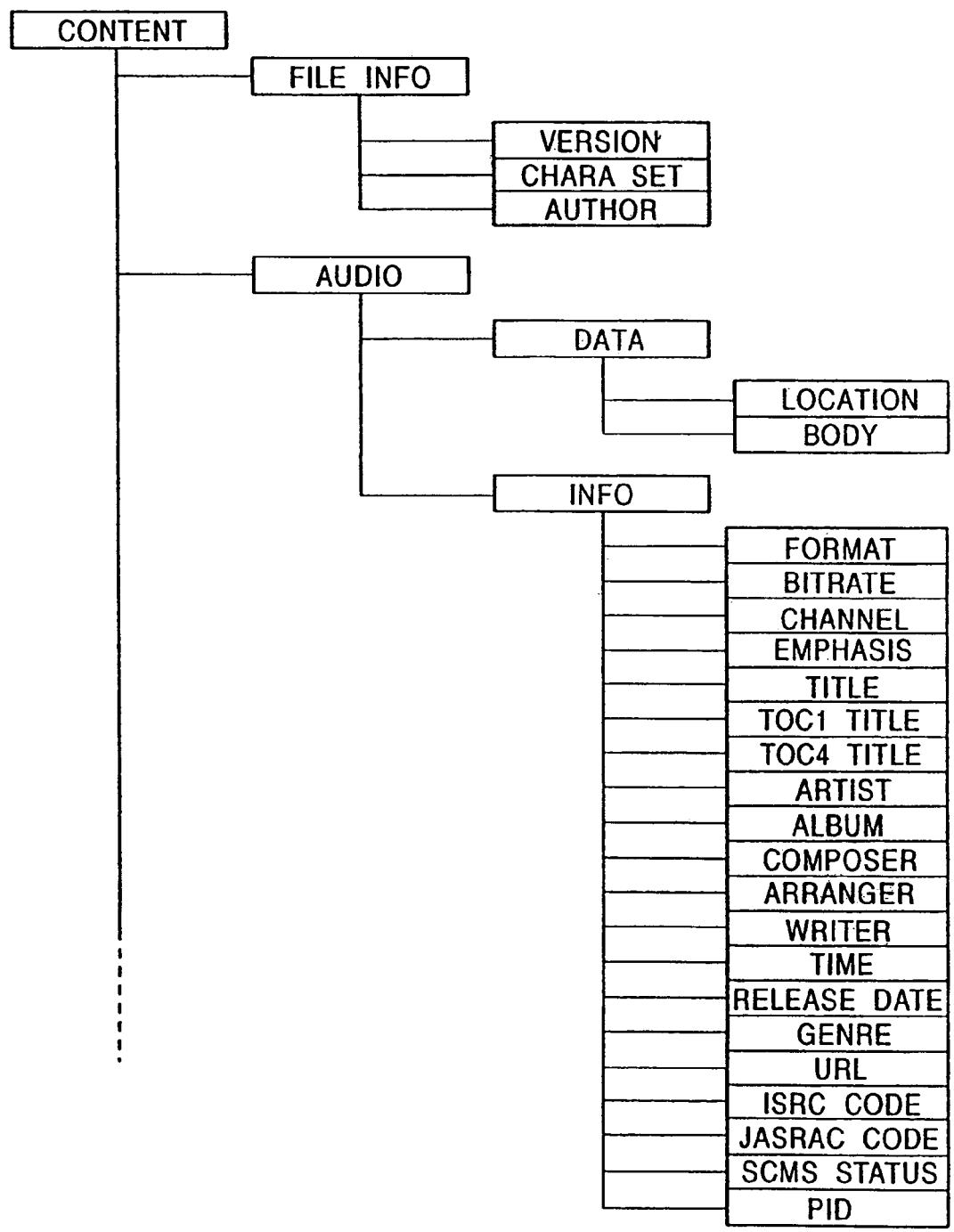
FIGS. 12A and 12B show the structure of a multimedia file transmitted and received in the delivery system of the embodiment of the present invention.
Figure 12B:
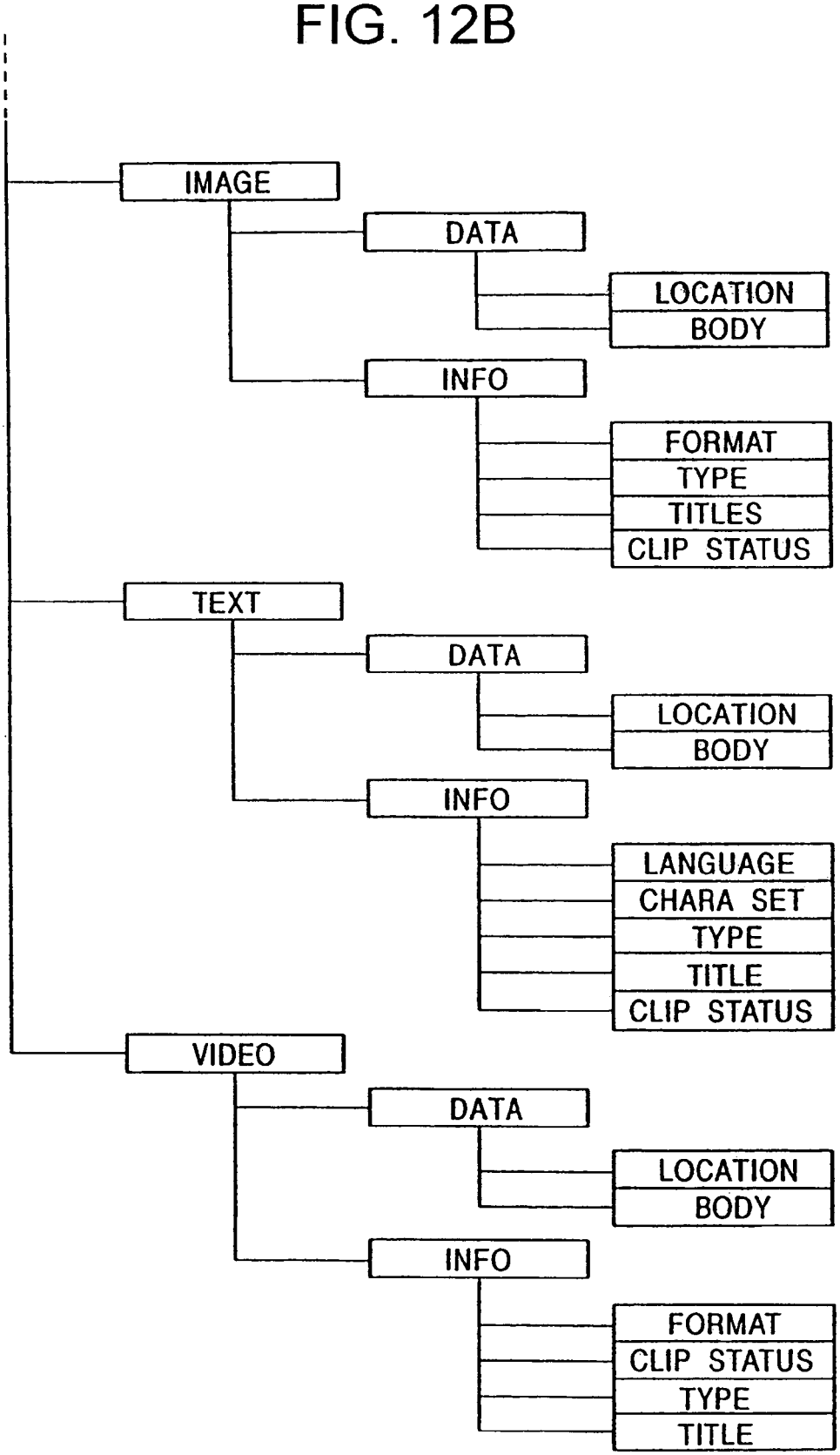

The multimedia file structure in this embodiment is shown in FIG. 12. A file "Content" is placed as a root block. Hierarchically placed under the file "Content" are "File Info", "Audio", "Image", "Text", and "Video". The data sequence is arranged in the order of "File Info", "Audio", "Image", "Text", and "Video" in the data area of the "Content" block.

The "File Info" block holds information about a content file as a multimedia file and, for example, includes child blocks "Version", "Charaset", and "Author".

The "Audio" block holds information about the audio data contained in the multimedia file, and includes child blocks "Data" and "Info".

The "Data" block has child blocks "Location" and "Body". Arranged here is child block combinations of "Location" and "Body", the number of which is equal to the number of pieces of audio data to be held in the multimedia.

The "Location" block holds information indicating where the body of the audio data is held. The description "internal" here indicates that the audio data is embedded in the multimedia file while the description "external" indicates that the audio data is managed as an external reference file. Although the format of the multimedia of this embodiment permits the data body to be embedded in the file, the data body can be set to be linkable as an external reference file.

The "Body" block holds the body of the audio data when the "Location" block states "internal", and holds a URL as a link destination when the "Location" block states "external".

The "Info" block under the "Audio" block includes "Format", "Bitrate", "Channel", ..., "SCMSStatus", and "PID".

Although the "Image", "Text", and "Video" blocks are shown here, the discussion of the structure thereof is skipped here.

In the above arrangement, the block having target data is found by referencing the block name in the header area in each block stored in the data area of the "Content" block. For example, the audio data is searched for by simply finding a block having the block name "Audio" stated in the block name area of the header. During the searching, the "Audio" block is quickly found by performing block jumping according to the value of "Data Length" held in the data length area of the header area. To acquire desired data from the "Audio" block, a similar procedure is followed.

Figure 13:
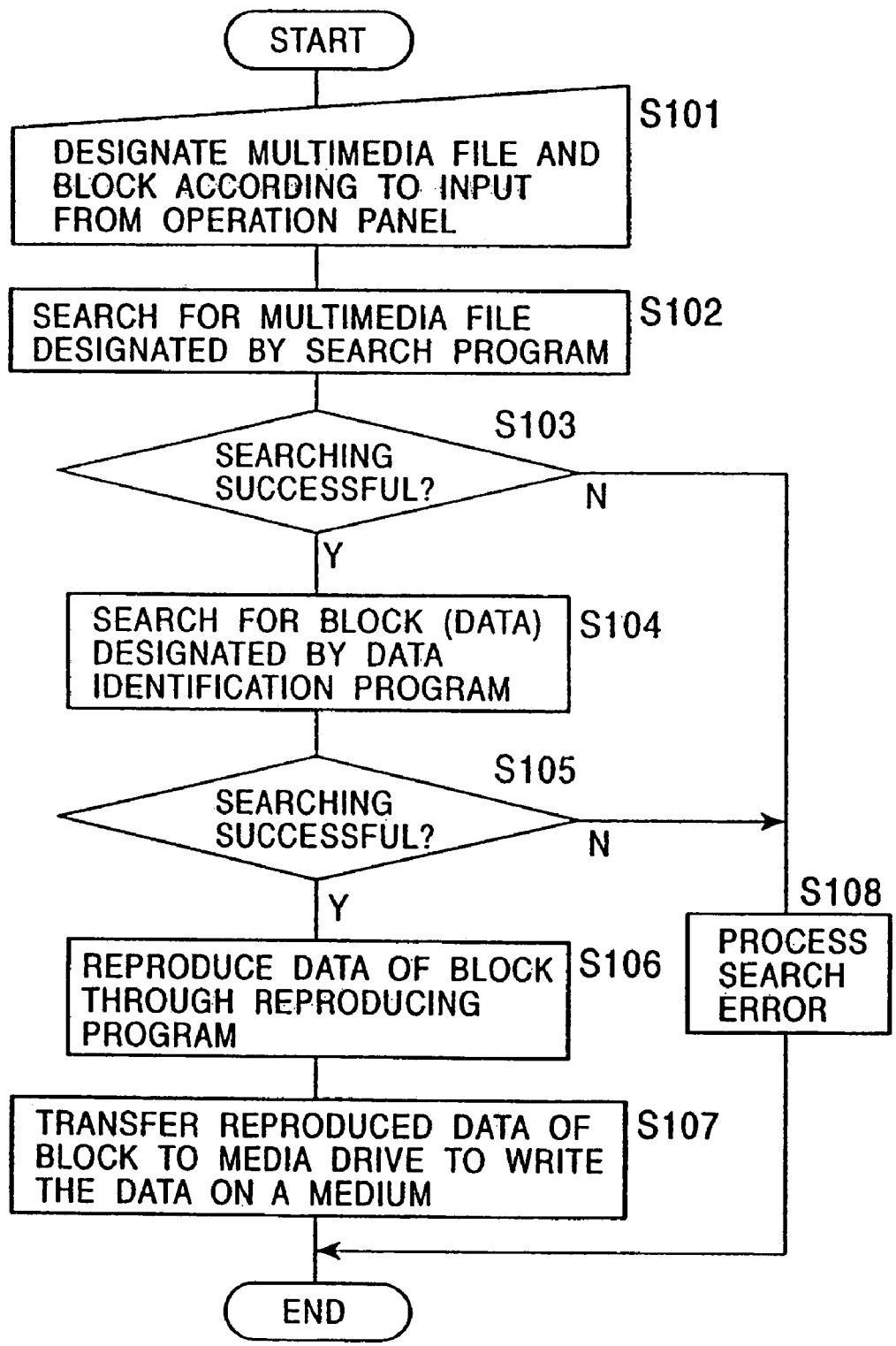
FIG. 13 is a flow diagram showing a multimedia information reproduction process in a receiver terminal.

The structure of the multimedia file shown in FIGS. 12 and 13 is for illustrative purposes only, and may be appropriately modified. For example, the block names given to the blocks are not limited to those illustrated here, and may be changed depending on specifications of actual applications, etc.

3 Reproduction Process

The reproduction process of the data designated by the multimedia file performed in the receiver terminal 300 of this embodiment is discussed, referring to a flow diagram shown in FIG. 14.

The process shown in FIG. 14 is carried out by the controller 301 in accordance with the program for multimedia file 401.

In step S101, the multimedia file and block holding data to be reproduced are designated in response to the operation performed on the operation panel 305. The designation here is performed by the file name stated as the block name.

In step S102, the designated multimedia file is searched for among a number of multimedia files held in the main storage unit 302 in accordance with the search program 402 of the program for multimedia file 401. The block name of the root block of the multimedia file held in the main storage unit 302 is referenced.

In step S103, it is determined whether the searching in step S102 has been successful. When the searching of the multimedia file of interest has failed with No result in step S103, the process proceeds to step S108 to perform a search error process. For example, the search error process causes the display 306 to present a statement notifying a user that the multimedia file of interest for searching is not stored in the receiver terminal 300.

When the affirmative answer is obtained in step S103 with the multimedia file of interest successfully searched, the process proceeds to step S104.

In step S104, the block (data) designated in step S101 is searched in accordance with the execution program of the data identification program 403. The block having the data of interest for searching is found by searching for the blocks within the searched multimedia file. A high-speed searching is performed by referencing the description in the header area.

It is then determined in step S105 whether the search result in step S104 has been successful. When it is determined that the search result has been unsuccessful, the process proceeds to step S108. In this case, the search error process causes the display 306 to present a statement notifying the user that the designated data is not present.

When it is determined in step S105 that the search result has been successful, the process proceeds to step S106.

In step S106, the data in the searched block is reproduced and output in accordance with the execution program of the reproduction program 404. Here, the reproduction and output of the data here refer to the extraction and acquisition of the data held in the data area of the searched block.

In step S107, the data acquired in step S106 is transferred to the media drive 307 in accordance with the execution program of the reproduction program 404, and is written on the MD loaded in the media drive 307. Optionally, the data may be temporarily stored in the RAM of the auxiliary storage unit 303, and is then transferred to the media drive 307 at a data transfer rate compatible with the media drive 307.

The present invention is not limited to the above embodiment.

In this embodiment, the medium, on which the data extracted from the multimedia file is recorded, is the MD. The MD is one example. The medium may be one of a diversity of data recording disks, a tape medium, and a removable medium having a memory element. The body of the recording and reproducing device 1 having a built-in flash memory is assembled in the receiver terminal 300, and the data is written on the memory in the recording and reproducing device 1.

The delivery system for delivering the musical composition (and the image, and the data such as the text associated therewith) has been described. The present invention finds applications in a delivery system for delivering other type of data, and a device constituting such delivery system. The present invention is applicable to a system which distributes multimedia information using package media such as a CD-ROM or a DVD. The structure of the multimedia information of the present invention may be adopted as a data file structure other than the multimedia content.

In accordance with the present invention, the multimedia information is arranged according to the unit of block data including the header area and the data area holding the body of the data. The format of the data structure of the present invention allows the multimedia information to be embedded in the file structure. The present invention thus provides an information delivery system for delivering the multimedia information, an information processing apparatus for processing the multimedia information, and a recording medium for recording the multimedia information.

In the arrangement of the present invention, the creation and editing of the information file are easy compared with the case in which the format such as the known HTML is used in the multimedia information. The processing of the desired data, such as searching, becomes an easy job.

The information in the header area of the multimedia information includes at least the file name identification information (block name) and the data length identification information (data length). When the searching is performed to reproduce the multimedia information, the data sequence of the multimedia information is searched for while the block name stated in the header is being checked. Referencing the data length allows a jump to the next block data, thereby expediting the searching.

The structure of the multimedia information of the present invention allows the data area of one block to hold a child block. The information of the header area includes the block name identification information (block name), the number of child blocks information (number of child blocks), and the data length identification information (data length). The file as a single piece of the multimedia information of the present invention is described in a hierarchical structure. The hierarchical structure is then managed by the content stated in the header.

A plurality of pieces of data of one related topic is held in one block in a hierarchical structure. The management of the data in the multimedia file becomes easy. The creation and editing of the file are also easy. Even multimedia information holding numerous pieces of data is quickly searched for, and the processing of the data becomes simple.

With the delimiting information having a predetermined length inserted between areas of the multimedia information, the identification of each area during the searching becomes easy and precise.

What is claimed is:

1. An apparatus for processing information, comprising:
means for acquiring multimedia information having a structure of block data including a header area and a data area for holding data;
means for extracting desired data from the acquired multimedia information by searching for the desired data based on the content described in the header area; and
means for reproducing the extracted data,
wherein the desired data includes data without any links,
wherein the header area of one piece of block data has a structure in which block name identification information describing a name identifying the content of at least current block data and data length identification information indicating the data length of the current block data are arranged in a predetermined order,
wherein the means for extracting searches for the desired data, based on the block name identification information and the data length identification information,
wherein the data area of one piece of block data stores data and the header area of one piece of block data has a structure in which, block name identification information describing a name identifying the content of at least current block data, child block data count identification information indicating the number of pieces of child block data stored in the data area of the current block data, and data length identification information indicating the data length are arranged in a predetermined order, and
wherein the means for extracting searches for the desired data, based on the block name identification information, the child block data count identification information, and the data length identification information.

2. An apparatus for processing information, comprising:
means for acquiring multimedia information having a structure of block data including a header area and a data area holding data;
means for extracting desired data from the acquired multimedia information acquired by searching for the desired data based on the content described in the header area; and means for reproducing the extracted data, wherein the desired data includes data without any links, wherein the data area of one piece of block data stores data and the header area of one piece of block data has a structure in which, block name identification information describing a name identifying the content of at least current block data, child block data count identification information indicating the number of pieces of child block data stored in the data area of the current block data, and data length identification information indicating the data length are arranged in a predetermined order, wherein the means for extracting searches for the desired data, based on the block name identification information, the child block data count identification information, and the data length identification information, wherein one piece of block data has a structure in which delimitation identification information having a predetermined length indicating a delimitation of an area is inserted in a data sequence composed of an information area, forming the header area, and the data area, and wherein the means for extracting identifies a delimitation position of the areas, during the searching, based on the delimitation identification information.

3. A method for processing multimedia information, comprising the steps of:

acquiring multimedia information having a structure of block data, the structure including a header area and a data area holding data;

extracting desired data from the acquired multimedia information by searching for the desired data based on the content described in the header area; and reproducing the extracted data, wherein the desired data includes data without any links, wherein the header area of one piece of block data has a structure in which, block name identification information describing a name identifying the content of at least current block data and data length identification information indicating the data length of the current block data are arranged in a predetermined order, wherein the data extractor step searches for the desired data, based on the block name identification information and the data length identification information, wherein the data area of one piece of block data stores data and the header area of one piece of block data has a structure in which, block name identification information describing a name identifying the content of at least current block data, child block data count identification information indicating the number of pieces of child block data stored in the data area of the current block data, and data length identification information indicating the data length are arranged in a predetermined order, and wherein the data extractor step searches for the desired data, based on the block name identification information, the child block data count identification information, and the data length identification information.

4. A method for processing multimedia information, comprising the steps of:

acquiring multimedia information having a structure of block data, the structure including a header area and a data area holding data;

extracting desired data from the acquired multimedia information by searching for the desired data based on the content described in the header area; and reproducing the extracted data, wherein the desired data includes data without any links, wherein the data area of one piece of block data stores data and the header area of one piece of block data has a structure in which, block name identification information describing a name identifying the content of at least current block data, child block data count identification information indicating the number of pieces of child block data stored in the data area of the current block data, and data length identification information indicating the data length are arranged in a predetermined order, wherein the searching for the desired data is based on the block name identification information, the child block data count identification information, and the data length identification information, wherein one piece of block data has a structure in which delimitation identification information having a predetermined length indicating a delimitation of an area is inserted in a data sequence composed of an information area, forming the header area, and the data area, and wherein a delimitation position of the areas is identified, during the searching, based on the delimitation identification information.

5. A computer readable storage medium, comprising instructions, which when executed on a processor, causes the processor to perform a method, the method comprising:

acquiring multimedia information having a structure of block data, the structure including a header area and a data area holding data;

extracting desired data from the acquired multimedia information, based on the content described in the header area; and reproducing the extracted data, wherein the desired data includes data without any links, wherein the header area of one piece of block data has a structure in which, block name identification information describing a name identifying the content of at least current block data and data length identification information indicating the data length of the current block data are arranged in a predetermined order, wherein the searching for the desired data is based on the block name identification information and the data length identification information, wherein the data area of one piece of block data stores data and the header area of one piece of block data has a structure in which, block name identification information describing a name identifying the content of at least current block data, child block data count identification information indicating the number of pieces of child block data stored in the data area of the current block data, and data length identification information indicating the data length are arranged in a predetermined order, and wherein the searching for the desired data is based on the block name identification information, the child block data count identification information, and the data length identification information.

6. A computer readable storage medium, comprising instructions, which when executed on a processor, causes the processor to perform a method, the method comprising:

acquiring multimedia information having a structure of block data, the structure including a header area and a data area holding data;

extracting desired data from the acquired multimedia information by searching for the desired data based on the content described in the header area; and reproducing the extracted data, wherein the desired data includes data without any links, wherein the data area of one piece of block data stores data and the header area of one piece of block data has a structure in which, block name identification information describing a name identifying the content of at least current block data, child block data count identification information indicating the number of pieces of child block data stored in the data area of the current block data, and data length identification information indicating the data length are arranged in a predetermined order, wherein the searching for the desired data is based on the block name identification information, the child block data count identification information, and the data length identification information, wherein one piece of block data has a structure in which delimitation identification information having a predetermined length indicating a delimitation of an area is inserted in a data sequence composed of an information area, forming the header area, and the data area, and wherein a delimitation position of the areas is identified, during the searching, based on the delimitation identification information.

* * * * *